(12) United States Patent
Nakamura

(10) Patent No.: US 10,567,668 B2
(45) Date of Patent: Feb. 18, 2020

(54) IMAGE CAPTURING APPARATUS CAPABLE OF INTERMITTENTLY CAPTURING IMAGES, METHOD FOR CONTROLLING THE SAME, AND RECORDING MEDIUM

(71) Applicant: CANON KABUSHIKI KAISHA, Tokyo (JP)

(72) Inventor: Hinako Nakamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/271,650

(22) Filed: Feb. 8, 2019

(65) Prior Publication Data

US 2019/0246024 A1    Aug. 8, 2019

Related U.S. Application Data

(63) Continuation of application No. 15/629,477, filed on Jun. 21, 2017, now Pat. No. 10,230,899.

(30) Foreign Application Priority Data

Jun. 27, 2016  (JP) ................................. 2016-126971
Jan. 30, 2017  (JP) ................................. 2017-014850

(51) Int. Cl.
*H04N 5/77*    (2006.01)
*H04N 5/78*    (2006.01)
(Continued)

(52) U.S. Cl.
CPC ......... *H04N 5/2352* (2013.01); *H04N 5/2351* (2013.01); *H04N 5/2353* (2013.01);
(Continued)

(58) Field of Classification Search
CPC ........... H04N 5/23212; H04N 5/23245; H04N 5/23293; H04N 5/2351; H04N 5/2352;
(Continued)

(56) References Cited

U.S. PATENT DOCUMENTS

2008/0267608 A1    10/2008  Kubota
2016/0269617 A1*   9/2016   Tomita ..................... G02B 7/36
2017/0353660 A1*   12/2017  Osawa ................. H04N 5/2351

FOREIGN PATENT DOCUMENTS

CN    101567972 A    10/2009
CN    101843094 A    9/2010
(Continued)

*Primary Examiner* — Robert Chevalier
(74) *Attorney, Agent, or Firm* — Canon U.S.A., Inc. IP Division

(57) ABSTRACT

An image capturing apparatus for intermittently acquiring first images for use in generating a time lapse moving image, from among images corresponding to frames included in a moving image. The image capturing apparatus includes a target value setting unit configured to, based on a result of photometry, set a target value regarding an exposure when an image is acquired, a control value calculation unit configured to calculate a control value with respect to each frame regarding the exposure when brightness is changed toward the target value, and a control unit configured to control the exposure based on the control value. In a predetermined period before each first image is acquired, the control unit changes the exposure by a first degree of change, and outside the predetermined period, the control unit changes the exposure by a second degree of change different from the first degree of change.

12 Claims, 13 Drawing Sheets

(51) Int. Cl.
  *H04N 5/235* (2006.01)
  *H04N 5/915* (2006.01)
  *H04N 5/232* (2006.01)
  *H04N 5/783* (2006.01)
  *H04N 5/238* (2006.01)

(52) U.S. Cl.
  CPC ..... *H04N 5/23212* (2013.01); *H04N 5/23245* (2013.01); *H04N 5/23293* (2013.01); *H04N 5/77* (2013.01); *H04N 5/772* (2013.01); *H04N 5/783* (2013.01); *H04N 5/915* (2013.01); *H04N 5/238* (2013.01)

(58) Field of Classification Search
  CPC ........ H04N 5/2353; H04N 5/77; H04N 5/772; H04N 5/783; H04N 5/915; H04N 5/238
  USPC ....... 386/226, 232, 228, 229, 230, 248, 264, 386/278, 307, 322, 323
  See application file for complete search history.

(56) References Cited

FOREIGN PATENT DOCUMENTS

| | | |
|---|---|---|
| CN | 104822015 A | 8/2015 |
| CN | 105472236 A | 4/2016 |

* cited by examiner

FIG.4

| FRAME RATE [fps] | NUMBER OF FRAMES N [FRAMES] |
|---|---|
| 120 | 24 |
| 60 | 12 |
| 30 | 6 |

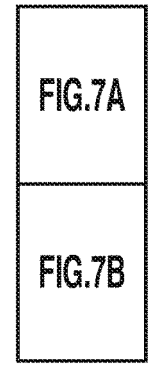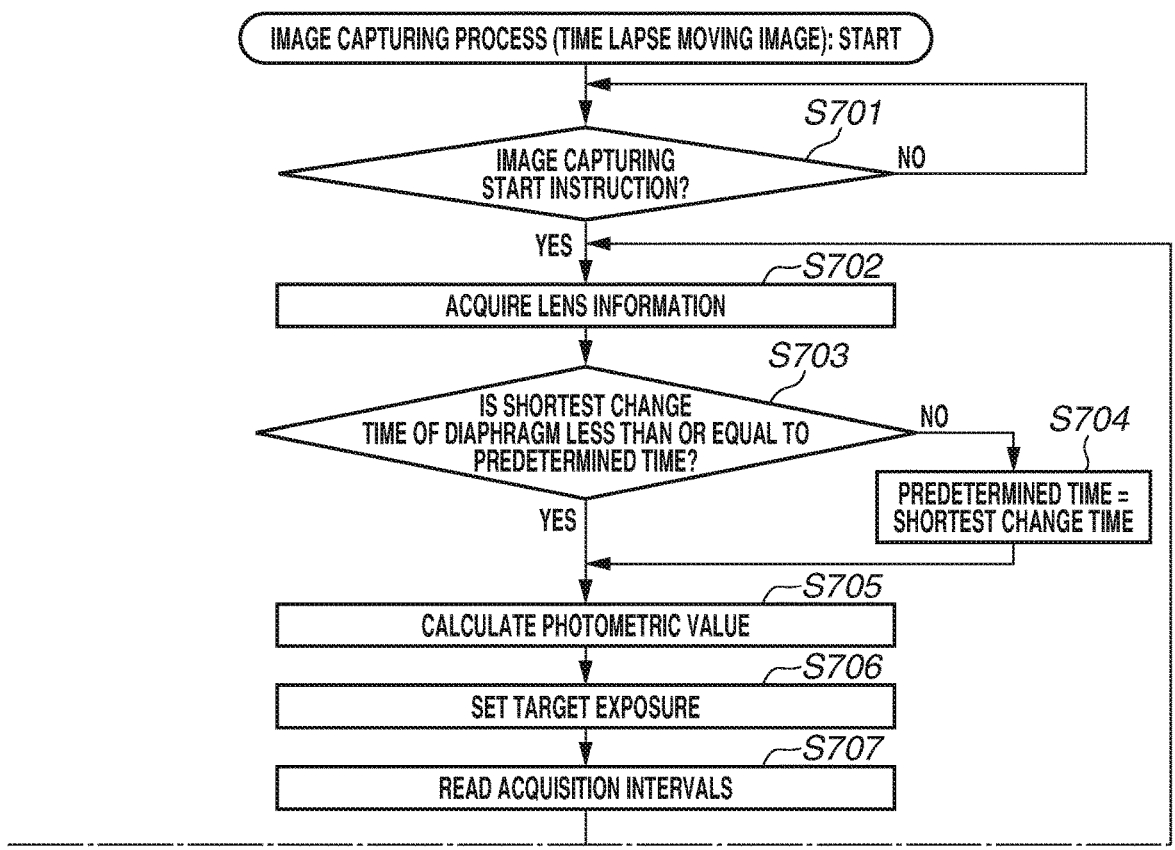

IMAGE CAPTURING APPARATUS CAPABLE
OF INTERMITTENTLY CAPTURING
IMAGES, METHOD FOR CONTROLLING
THE SAME, AND RECORDING MEDIUM

This application is a Continuation of U.S. application Ser. No. 15/629,477, filed Jun. 21, 2017, which claims priority from Japanese Patent Application No. 2016-126971, filed Jun. 27, 2016, and Japanese Patent Application No. 2017-014850, filed Jan. 30, 2017. These applications are hereby incorporated by reference herein in their entireties.

BACKGROUND

Field

The present disclosure relates to an image capturing apparatus capable of intermittently capturing images for acquiring a time lapse moving image, a method for controlling the same, and a recording medium.

Description of the Related Art

Conventionally, there is known a technique for connecting, in order, a plurality of images acquired by intermittently capturing an image of an object, thereby acquiring a moving image (a so-called time lapse moving image) recorded by compressing temporal changes in the object.

As one of image capturing methods for acquiring such a time lapse moving image, Japanese Patent Application Laid-Open No. 2015-142327 discusses a technique for thinning images from a series of moving images for compression, thereby generating a time lapse moving image (a moving image-based interval image capturing technique).

SUMMARY

According to various embodiments, an image capturing apparatus for intermittently acquiring first images for use in generating a time lapse moving image, from among images corresponding to frames included in a moving image acquired using an image capturing unit of the image capturing apparatus, is provided. The image capturing apparatus includes a photometric unit configured to perform photometry of an object, a target value setting unit configured to, based on a result of the photometry performed by the photometric unit, set a target value regarding an exposure when an image is acquired using the image capturing unit, a control value calculation unit configured to calculate a control value with respect to each frame regarding the exposure when brightness is changed toward the target value set by the target value setting unit, and a control unit configured to control the exposure based on the control value calculated by the control value calculation unit. In a predetermined period from predetermined timing before each first image is acquired to when the first image is acquired, the control unit changes the exposure by a first degree of change, and outside the predetermined period, the control unit changes the exposure by a second degree of change different from the first degree of change. And in a case where the same amount of exposure is changed in the predetermined period and outside the predetermined period, the exposure changes more steeply by the first degree of change than by the second degree of change when an image is acquired.

Further features will become apparent from the following description of exemplary embodiments with reference to the attached drawings.

BRIEF DESCRIPTION OF THE DRAWINGS

FIG. 4 is a diagram illustrating a relationship between a frame rate and a predetermined number of frames N in which an exposure is changed toward a target exposure in the normal moving image mode according to various embodiments.

DESCRIPTION OF THE EMBODIMENTS (Basic Configuration of Digital Camera 1)

Figure 1:
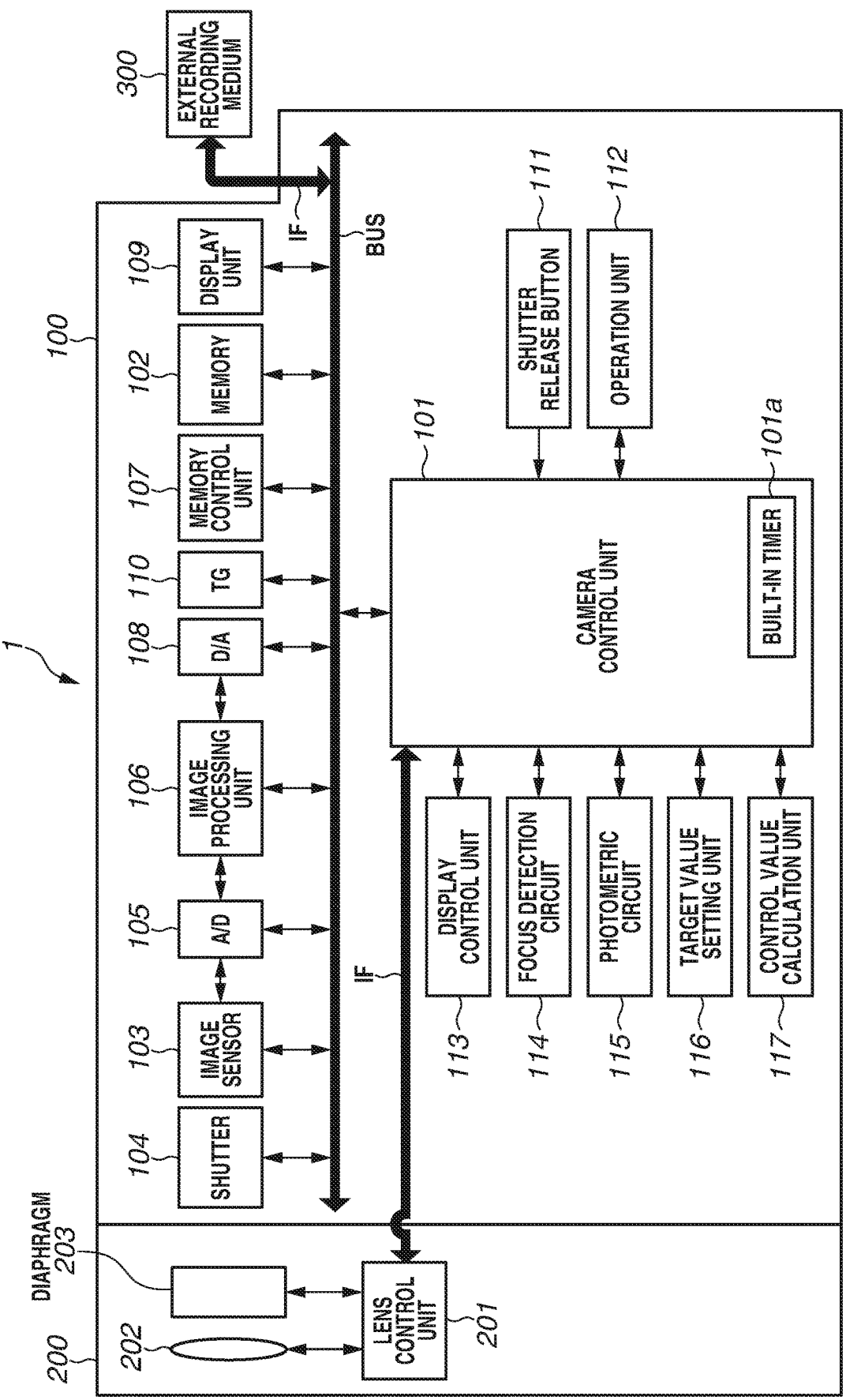
FIG. 1 is a block diagram illustrating an example of a configuration of a digital camera 1, which is an exemplary embodiment of an image capturing apparatus in which various embodiments are carried out.

Desirable exemplary embodiments are described below based on the attached drawings. FIG. 1 is a block diagram illustrating an example of the configuration of a digital camera (hereinafter referred to simply as "camera") 1, which is a first exemplary embodiment of an image capturing apparatus in which various embodiments are carried out. One or more of functional blocks illustrated in FIG. 1 may be achieved by hardware such as an application-specific integrated circuit (ASIC) or a programmable logic array (PLA), or may be achieved by a programmable processor such as a central processing unit (CPU) or a microprocessor unit (MPU) executing software. Alternatively, one or more of the functional blocks may be achieved by the combination of software and hardware. Thus, in the following description, even in a case where different functional blocks perform operations, the same hardware can perform the operations.

As illustrated in FIG. 1, the camera 1 according to the present exemplary embodiment includes a camera main body 100 and a lens unit 200. The lens unit 200 is configured to be freely attachable to and detachable from the camera main body 100. With reference to FIG. 1, an illustrative description is given below of the configuration of the camera in the state where the lens unit 200 is connected (attached) to the camera main body 100. The camera 1 may be configured such that the camera main body 100 and the lens unit 200 are provided in an integrated manner.

A camera control unit 101 is a camera control unit for performing overall control of the components of the camera main body 100 and includes a camera microcomputer (a camera CPU) (not illustrated). Further, the camera control unit 101 includes a built-in timer 101a, which can measure time. The built-in timer 101a is a real-time clock and measures time based on timer accuracy stored in advance in a memory 102 and information of a time zone set in advance. The control content of the camera control unit 101 will be described below with various operations. The memory 102 is a recording medium capable of recording data regarding the operation of the camera 1 and various pieces of data acquired using the camera 1. The memory 102 according to the present exemplary embodiment includes a read-only memory (ROM) area as a non-volatile memory and a random-access memory (RAM) area as a volatile memory.

A lens control unit 201 is a lens control unit for performing overall control of the operation of the lens unit 200 and includes a lens microcomputer (a lens CPU) (not illustrated). The lens control unit 201 can communicate with the camera control unit 101 via an interface (IF) in the state where the lens unit 200 is attached to the camera main body 100. An imaging lens group 202 is a lens group including a plurality of lenses such as a shift lens, a zoom lens, and a focus lens and can guide a light beam representing an optical image of an object to the camera main body 100 side. A diaphragm 203 is a light amount adjustment member for adjusting the amount of light regarding the speed of light passing through the inside of the imaging lens group 202. The driving of the imaging lens group 202 and the diaphragm 203 is controlled by the lens control unit 201.

An image sensor 103 is an image capturing unit that employs a charge accumulation solid-state image sensor such as a complementary metal-oxide-semiconductor (CMOS). The image sensor 103 photoelectrically converts a light beam incident on the image sensor 103 through the lens unit 200 and outputs analog image data. A shutter 104 is a blocking member capable of blocking a light beam to be incident on the image sensor 103. The shutter 104 can transition to a retracted state where the shutter 104 guides an incident light beam to the image sensor 103 without blocking the light beam, and a blocking state where the shutter 104 blocks an incident light beam.

An analog-to-digital (A/D) conversion unit 105 is an A/D conversion unit for converting analog image data output from the image sensor 103 into digital image data. An image processing unit 106 is an image processing unit for performing on the digital image data a resizing process such as predetermined image interpolation or reduction, a color conversion process, and the process of calculating the numbers of pieces of pixel data of saturated pixels and under-exposed pixels. Further, the image processing unit 106 is also a white balance (hereinafter referred to as "WB") processing unit for performing a WB calculation process on the digital image data. In the WB calculation process, the signal values of respective color signals (signals in the red, green, and blue (RGB) Bayer arrangement) corresponding to the image data output from the image sensor 103 are multiplied by a predetermined WB coefficient, whereby it is possible to make WB adjustment on the image data according to various conditions. The predetermined WB coefficient is a gain amount that differs for each color signal. This WB coefficient is set based on, for example, data stored by assuming predetermined ambient light in advance, data calculated based on a color temperature manually set by a user, or data calculated by extracting the signal values of the respective color signals from the acquired image data.

A digital-to-analog (D/A) conversion unit 108 is a D/A conversion unit for converting digital image data into analog image data for display. A memory control unit 107 is a recording control unit for controlling the input and output of image data to and from components such as the A/D conversion unit 105, the image processing unit 106, and the D/A conversion unit 108. An image capturing unit according to the present exemplary embodiment may be configured to include the A/D conversion unit 105, the image processing unit 106, and the D/A conversion unit 108 as components other than the image sensor 103.

A timing generator (hereinafter referred to as "TG") 110 is a timing generation unit for transmitting timing regarding each operation of the camera 1 to the components of the camera 1. For example, the TG 110 can generate various types of timing for accumulating charges in the image sensor 103, changing the frame rate, and changing the state of the shutter 104.

A display unit 109 is a display unit including a thin-film transistor (TFT) liquid crystal display (LCD) (a thin-film-transistor-driven liquid crystal display device) and can display analog image data for display. The display unit 109 can perform so-called live view display (hereinafter referred to as "LV display") for sequentially displaying image data acquired using the image sensor 103. The display unit 109 can also display various pieces of information other than the acquired image data.

A shutter release button 111 is an image capturing instruction unit for giving an instruction to start an image capturing preparation operation and an image capturing operation using the camera 1. The user changes the shutter release button 111 to an SW1 state (e.g., half-presses the shutter release button 111), thereby giving an instruction to start an image capturing preparation operation. As a result, focus control and photometric calculation are executed. Further, the user changes the shutter release button 111 to an SW2 state (e.g., full-presses the shutter release button 111), thereby giving an instruction to start an image capturing operation. As a result, a series of processes from the capturing of an image of an object to the acquisition of the image is executed.

Figure 2:
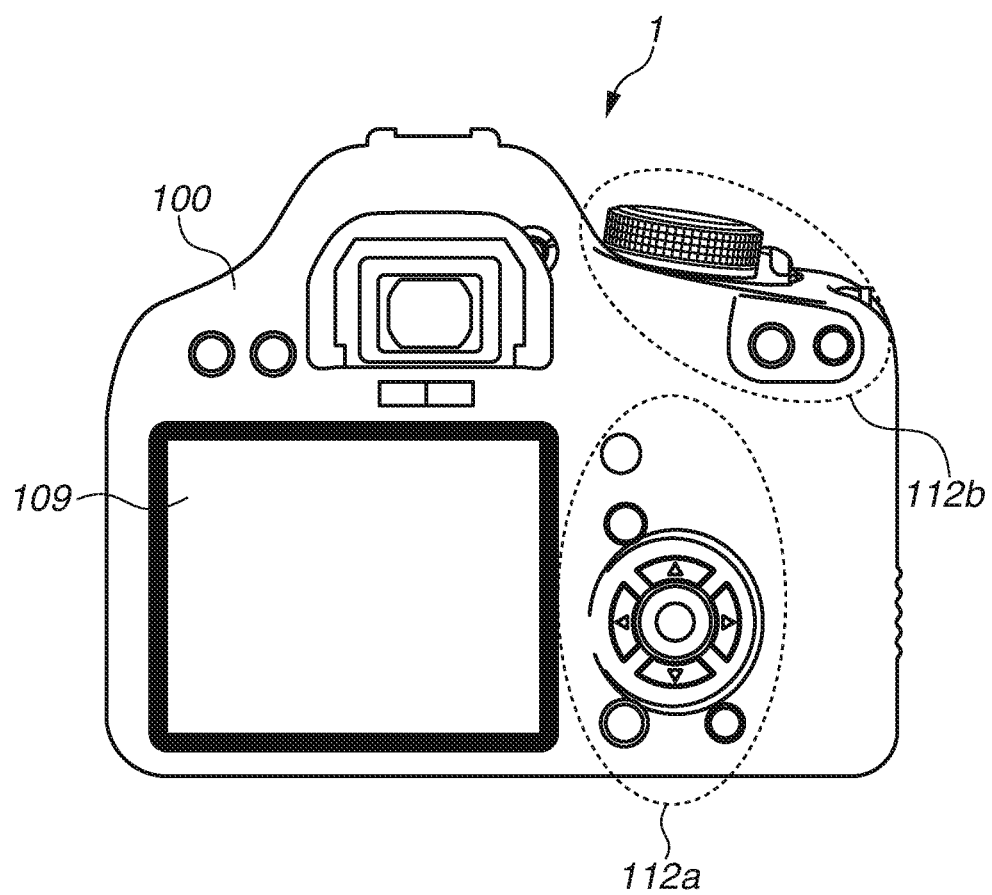
FIG. 2 is a diagram illustrating an external view (a back view) of the camera 1 according to the exemplary embodiment.

An operation unit 112 is an operation unit for inputting various operation instructions to the camera control unit 101. FIG. 2 is a diagram illustrating an external view (a back view) of the camera 1 according to the exemplary embodiment of the present disclosure. Dashed portions illustrated in FIG. 2 indicate a first operation unit 112a and a second operation unit 112b. The first operation unit 112a includes direction indication buttons for giving an instruction to perform various operations regarding the capturing of an image, and an LV button for giving an instruction to execute and end LV display on the display unit 109. The second operation unit 112b includes a power switch and a mode dial for setting an image capturing mode. If a capacitance touch panel is employed as the display unit 109, the display unit 109 may be configured to function also as the shutter release button 111 and the operation unit 112. In this case, the user can set the above items by operating a user interface (UI) displayed on the display unit 109. A display control unit 113 is a display control unit for performing overall control of the display of image data using the display unit 109. According to an instruction from the camera control unit 101, the display control unit 113 controls the selection of image data to be displayed on the display unit 109, and the turning on and off (the display and non-display) of the display unit 109.

In the present exemplary embodiment, it is possible to set as the image capturing mode a plurality of modes such as a normal still image mode, a normal moving image mode (a second mode), and a time lapse mode (a first mode). The normal still image mode is the mode of acquiring a single piece of image data (a still image) for recording. The normal moving image mode is the mode of consecutively accumulating charges (capturing images) using the image sensor 103, thereby acquiring a plurality of consecutive pieces of image data. These plurality of pieces of image data are connected together in order and displayed (or recorded), whereby it is possible to perform LV display and record a moving image. The time lapse mode is the mode of acquiring images (hereinafter, "time lapse images") for use in generating a time lapse moving image, which is a moving image obtained by connecting intermittently acquired pieces of image data. These time lapse images are connected together in the order of capturing (the order of acquisition), whereby it is possible to generate a time lapse moving image. For description, time lapse images for use in generating a time lapse moving image are referred to as "first images", and images not for use in generating a time lapse moving image are referred to as "second images".

The details of the time lapse mode are described. In the time lapse mode, first, images are consecutively captured using the image sensor 103, thereby acquiring a plurality of pieces of image data. The plurality of acquired pieces of image data are used for LV display on the display unit 109. From among the plurality of pieces of image data, time lapse images for use in generating a time lapse moving image are selected (set) based on image capturing intervals (intervals) set in advance. Then, the set time lapse images are connected together in the order of acquisition, thereby acquiring a time lapse moving image. In the normal moving image mode and the time lapse mode, charge accumulation rows of the image sensor 103 for capturing an object are reduced as compared with the normal still image mode (charges are accumulated by thinning pixel rows). Further, in the time lapse mode, the image capturing intervals (the acquisition intervals of time lapse images), the total number of times of acquisition, and the total time of capturing images can be optionally set by the user using the operation unit 112.

At this time, the reproduction time of a moving image acquired in the normal moving image mode approximately coincides with the time required to capture images for acquiring the moving image. In contrast, the reproduction time of a time lapse moving image acquired in the time lapse mode is different from the time required to capture images for acquiring the moving image. In other words, the total time required to acquire a time lapse moving image is longer than the total time required to acquire a moving image for the same reproduction time in the normal moving image mode. A time lapse moving image is a moving image obtained by connecting intermittent pieces of image data acquired in a certain period. Thus, the reproduction time of the moving image is shorter than the total time of capturing images (the time from the start to the end of the capturing of images) for acquiring a single time lapse moving image. Thus, a time lapse moving image is a moving image obtained by compressing changes over time in an object.

A focus detection circuit 114 is a focus detection unit including a focus sensor (not illustrated) and for detecting the in-focus state of an optical image corresponding to a light beam incident from the lens unit 200 side through a mirror (not illustrated). The focus detection circuit 114 can calculate information of the distance from the camera 1 to a predetermined object based on a focus detection result. The detection result of the focus detection circuit 114 is used for control (focus control) of the lens position of a focus lens (not illustrated) included in the lens unit 200. In the present exemplary embodiment, focus control is executed by a phase difference detection method based on the output of the focus detection circuit 114. Alternatively, the configuration may be such that focus control is executed by a contrast detection method based on contrast information of image data. Further, in the present exemplary embodiment, the configuration is such that focus detection is executed using a focus sensor. Alternatively, the configuration may be such that focus detection is executed based on the output of the image sensor 103.

A photometric circuit 115 is a photometric unit including a photometric sensor (not illustrated) and for calculating the brightness (the photometric value) of an optical image corresponding to a light beam incident from the lens unit 200 side through a photometric lens (not illustrated). The result of photometry performed by the photometric circuit 115 is output to the camera control unit 101 and used for exposure control. A method for calculating a luminance value is specifically described. First, acquired image data is divided into a plurality of blocks, and the average luminance values of the respective blocks are calculated. Then, the average luminance values of the respective blocks are integrated to acquire a representative luminance value. In the following description, this representative luminance value is used as a photometric value for various types of processing and control such as exposure control. In the present exemplary embodiment, the configuration is such that photometric calculation is executed using a photometric sensor. Alternatively, the configuration may be such that photometric calculation is executed based on the output of the image sensor 103.

A target value setting unit 116 is a target value setting unit for setting target values of exposure control and WB adjustment based on the result of photometry of an object. That is, the target value setting unit 116 is a unit for, when an image is acquired using the image sensor 103, setting a target value regarding the brightness of the image, which is a value as a target when the brightness is changed in a predetermined number of frames. In the present exemplary embodiment, the configuration is such that when a moving image is acquired in the normal moving image mode and the time lapse mode, the photometric circuit 115 performs photometry of an object to calculate a photometric value every predetermined number of frames. The target value setting unit 116 sets a target value of the exposure and a target value of WB adjustment based on the photometric value.

At this time, the photometric value is a value that changes following a change in the luminance of the object. Thus, when a moving image is acquired, and if the exposure or the amount of WB adjustment is steeply changed toward the target value, the degree of change in the brightness between frames increases, and the brightness of the object in the moving image unnaturally changes. This gives a sense of discomfort to the user.

In response, in the present exemplary embodiment, control values regarding the exposure and the amount of WB adjustment with respect to each frame are provided so that changes in the exposure and WB adjustment are completed in the predetermined number of frames toward the target values set by the target value setting unit 116.

A control value calculation unit 117 is a control value calculation unit for, based on a target value set by the target value setting unit 116, calculating a control value regarding a change in the exposure or WB adjustment per frame. In other words, the control value calculation unit 117 is a calculation unit for calculating, from the exposure and the amount of WB adjustment of the current frame, control values of the exposure and WB adjustment in the process (the predetermined number of frames) until previously set target values are achieved. That is, the control value calculation unit 117 calculates a control value with respect to each frame when the brightness is changed toward a set target value, and these control values correspond to the setting values of the brightness of the respective frames when the brightness is changed.

The control value calculation unit 117 can also set the control values of the respective frames in a predetermined period to different values. For example, when a moving image is acquired, and if exposure control is executed so that the exposure reaches an exposure target value in the sixth frame after the current frame, exposure control values of the respective frames may be varied between six frames.

An external recording medium 300 is a recording medium, such as a memory card or a hard disk, capable of recording image data recorded in the memory 102. The external recording medium 300 is not limited to a memory card insertable into and removable from the camera main body 100, and may be an optical disc such as a digital versatile disc rewritable (DVD-RW) disc or a magnetic disk such as a hard disk. This is the basic configuration of the camera 1 according to the present exemplary embodiment.

(Normal Moving Image Mode)

Figure 3:
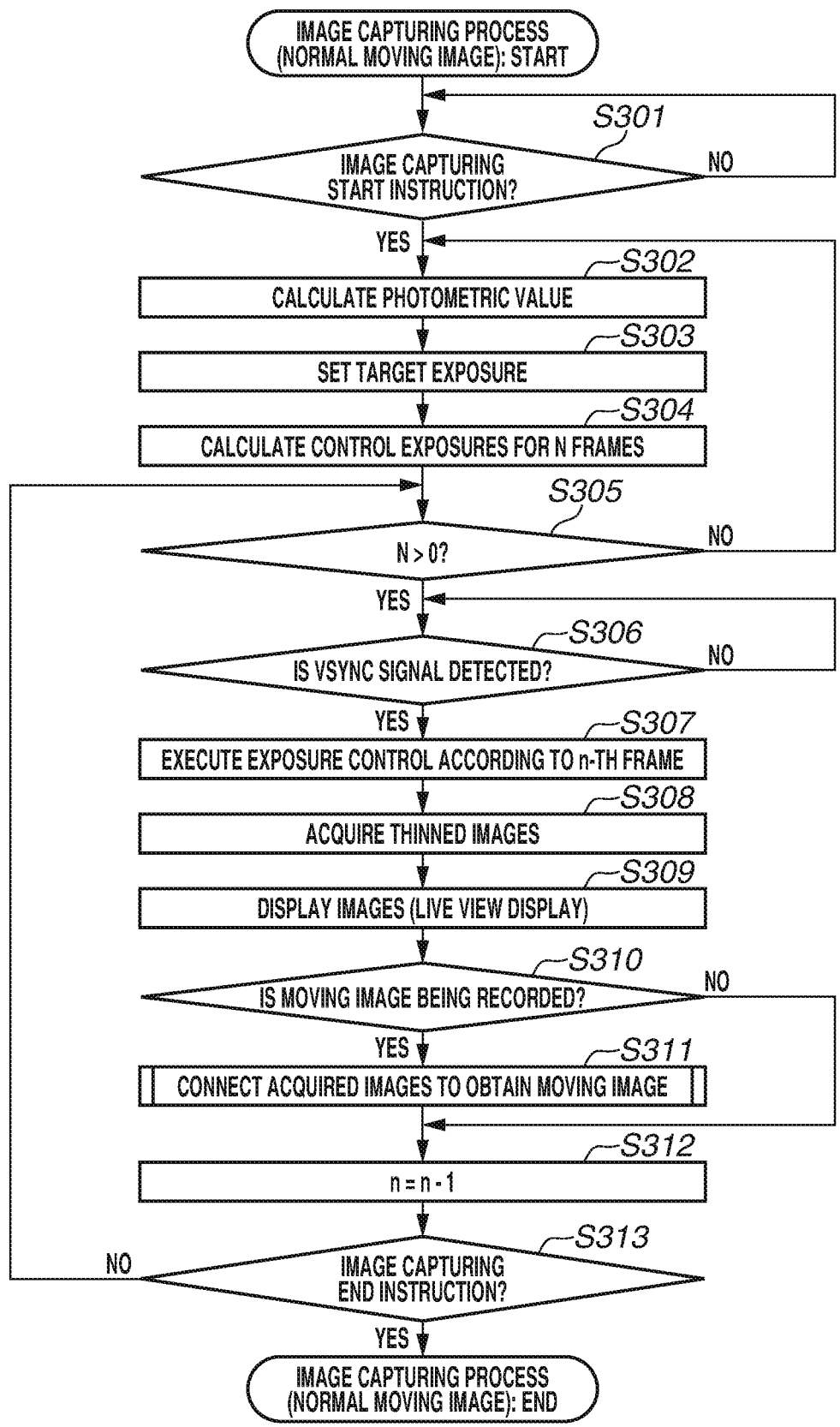
FIG. 3 is a flowchart illustrating an image capturing process in a normal moving image mode according to various embodiments.

With reference to FIG. 3, an image capturing process in the normal moving image mode is described below. FIG. 3 is a flowchart illustrating an image capturing process in the normal moving image mode according to the present disclosure. In the normal moving image mode, in step S301, the camera control unit 101 determines whether an instruction to start the capturing of an image is given. The process of step S301 is repeated until an instruction to start the capturing of an image is given. Examples of the image capturing start instruction in the normal moving image mode include an instruction to acquire a moving image for recording, and an instruction to acquire image data for use in LV display on the display unit 109 without recording. In a case where LV display on the display unit 109 is executed, an instruction to start LV display corresponds to the image capturing start instruction.

If an image capturing start instruction is given (YES in step S301), then in step S302, the camera control unit 101 calculates a photometric value based on the output result of the photometric circuit 115. In step S302, simultaneously, the camera control unit 101 increments a counter n to 0. Then, in step S303, based on the calculated photometric value, the target value setting unit 116 sets a target value of the exposure (a target exposure) regarding exposure control.

Next, in step S304, based on the acquired target exposure and the frame rate when a moving image is acquired, the control value calculation unit 117 calculates control values of the exposure (control exposures) for executing first follow-up control. The first follow-up control is a control method for executing exposure control taking into account the grade (the visual quality) of the moving image. With reference to FIG. 4, the details of this are described below.

FIG. 4 is a diagram illustrating the relationship between the frame rate and a predetermined number of frames N (N is a natural number) in which the exposure is changed toward the target exposure in the normal moving image mode according to the present disclosure. FIG. 4 illustrates a case where the exposure is changed by changing the aperture diameter of the diaphragm 203. In the present exemplary embodiment, the control value calculation unit 117 divides the difference between the current exposure and the target exposure by the predetermined number of frames N corresponding to the frame rate when a moving image is acquired, thereby calculating a control exposure per frame. For example, in a case where the frame rate of the moving image is set to 30 fps, the control exposures of the respective frames are calculated so that the exposure reaches the target exposure in a total of six frames from the current frame (after the target exposure is calculated in the present exemplary embodiment). Referring back to FIG. 3, after the control exposures for N frames are calculated, the camera control unit 101 sets the predetermined number of frames N to the counter n (n=N), which indicates the number of remaining frames in which follow-up control of the exposure toward the target exposure is required.

Next, in step S305, the camera control unit 101 confirms the number of remaining frames stocked in the counter n. Then, if the counter n is greater than 0 (YES in step S305), the processing proceeds to step S306. In step S306, the camera control unit 101 waits for a vertical synchronization signal (hereinafter referred to as a "VSYNC signal") to be generated by the TG 110. If the counter n is 0 (n=0) (NO in step S305), the processing proceeds to step S302. In step S302, the camera control unit 101 newly calculates a photometric value.

In step S306, the camera control unit 101 repeats the process until a VSYNC signal is detected. If a VSYNC signal is detected (YES in step S306), the processing proceeds to step S307. Then, in step S307, based on the calculated control exposures for N frames, the camera control unit (control unit) 101 executes exposure control so that the exposure reaches the control exposure of an n-th frame which corresponds to the counter n and in which an image is captured next. Specifically, in step S307, the camera control unit changes exposure parameters such as the diaphragm value regarding the degree of opening of the aperture diameter of the diaphragm 203, the shutter speed regarding the charge accumulation time of the image sensor 103, and the imaging sensitivity regarding analog and digital gain amounts. Which exposure parameter is used to execute exposure control is set based on table data regarding exposure control stored in advance in the memory 102.

Next, in step S308, the camera control unit 101 executes thinning accumulation of the image sensor 103 to capture an image of an object, thereby acquiring image data (hereinafter referred to simply as "images"). Then, in step S309, the camera control unit 101 displays the acquired images on the display unit 109 via the display control unit 113. The images are sequentially displayed frame by frame on the display unit 109 in the process of step S309, thereby executing LV display on the display unit 109.

Next, in step S310, the camera control unit 101 determines whether a moving image is being recorded by the current processing. That is, in step S310, the camera control unit 101 determines whether only LV display is being performed. If the camera control unit 101 determines that a moving image is not being recorded (NO in step S310), the processing proceeds to step S312. If the camera control unit 101 determines that a moving image is being recorded (YES in step S310), the processing proceeds to step S311. Then, in step S311, the camera control unit 101 executes the process of connecting the acquired images to sequentially obtain a moving image.

Next, in step S312, the camera control unit 101 subtracts 1 from the number of counts of the counter n (n=n−1) regarding the number of remaining frames in which follow-up control toward the currently set target exposure is executed. Then, in step S313, the camera control unit 101 determines whether an instruction to end the capturing of an image is given. Then, if the camera control unit 101 determines that an instruction to end the capturing of an image is not given (NO in step S313), the processing returns to step S305. If the camera control unit 101 determines that an instruction to end the capturing of an image is given (YES in step S313), the acquisition of a moving image ends, and the image capturing process in the normal moving image mode ends. Examples of the instruction to end the capturing of an image include an instruction to end the acquisition of a moving image, and an instruction to end LV display on the display unit 109.

Figure 5:
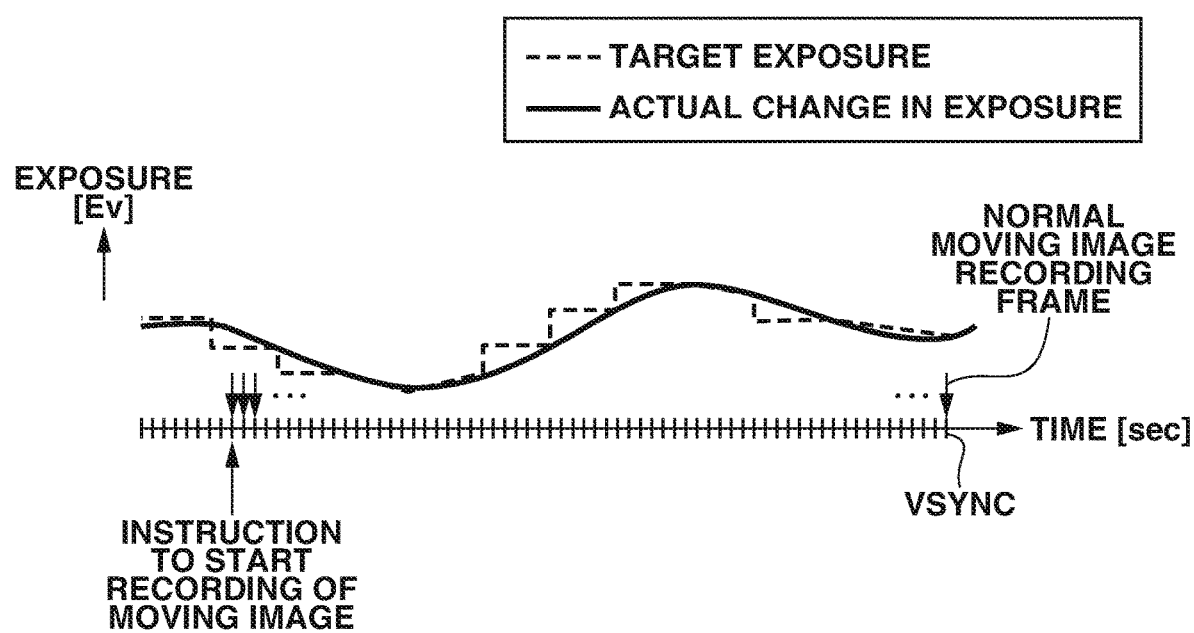
FIG. 5 is a diagram illustrating first follow-up control of the exposure according to various embodiments.

FIG. 5 is a diagram illustrating follow-up control (first follow-up control) of the exposure according to various embodiments. As illustrated in FIG. 5, in the first follow-up control in the normal moving image mode, first, photometric calculation is executed for every plurality of frames, and a target value for exposure control (a target exposure) is set. Then, control exposures are set for N frames so that the brightness smoothly changes between N frames toward the set target exposure. Then, exposure control is executed based on the control exposures. Regarding the display and the recording of images, an image read at the generation timing of a VSYNC signal is used for LV display, and this image is used as a recorded image.

Figure 6:
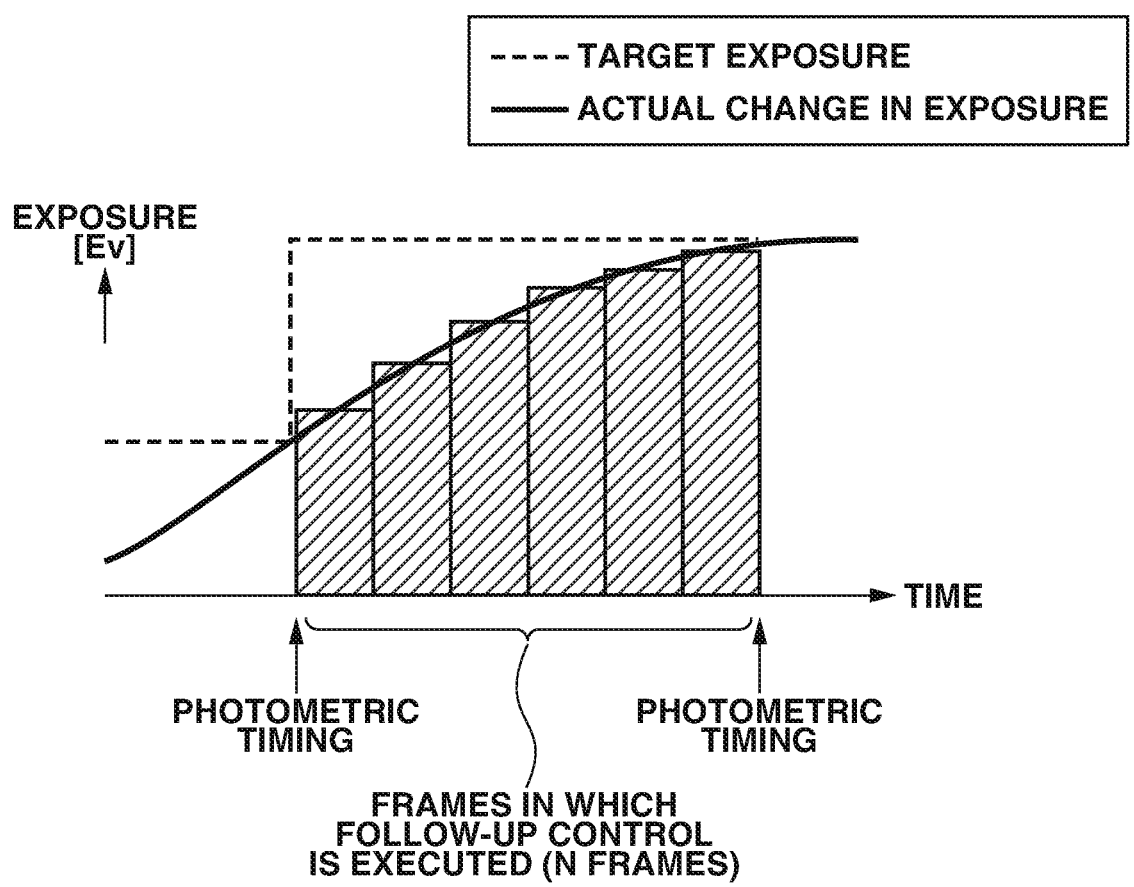
FIG. 6 is a diagram illustrating changes in the exposure in N predetermined frames in the normal moving image mode according to various embodiments.

FIG. 6 is a diagram illustrating changes in the exposure in the predetermined number of frames, which is N, in the normal moving image mode according to various embodiments. As illustrated in FIG. 6, the above configuration is employed, whereby the camera 1 can smoothly change the exposure toward the target exposure in each frame. Thus, it is possible to prevent an unnatural change in the brightness of a moving image according to a change in the luminance of an object.

(Time Lapse Mode)

Figure 7B:
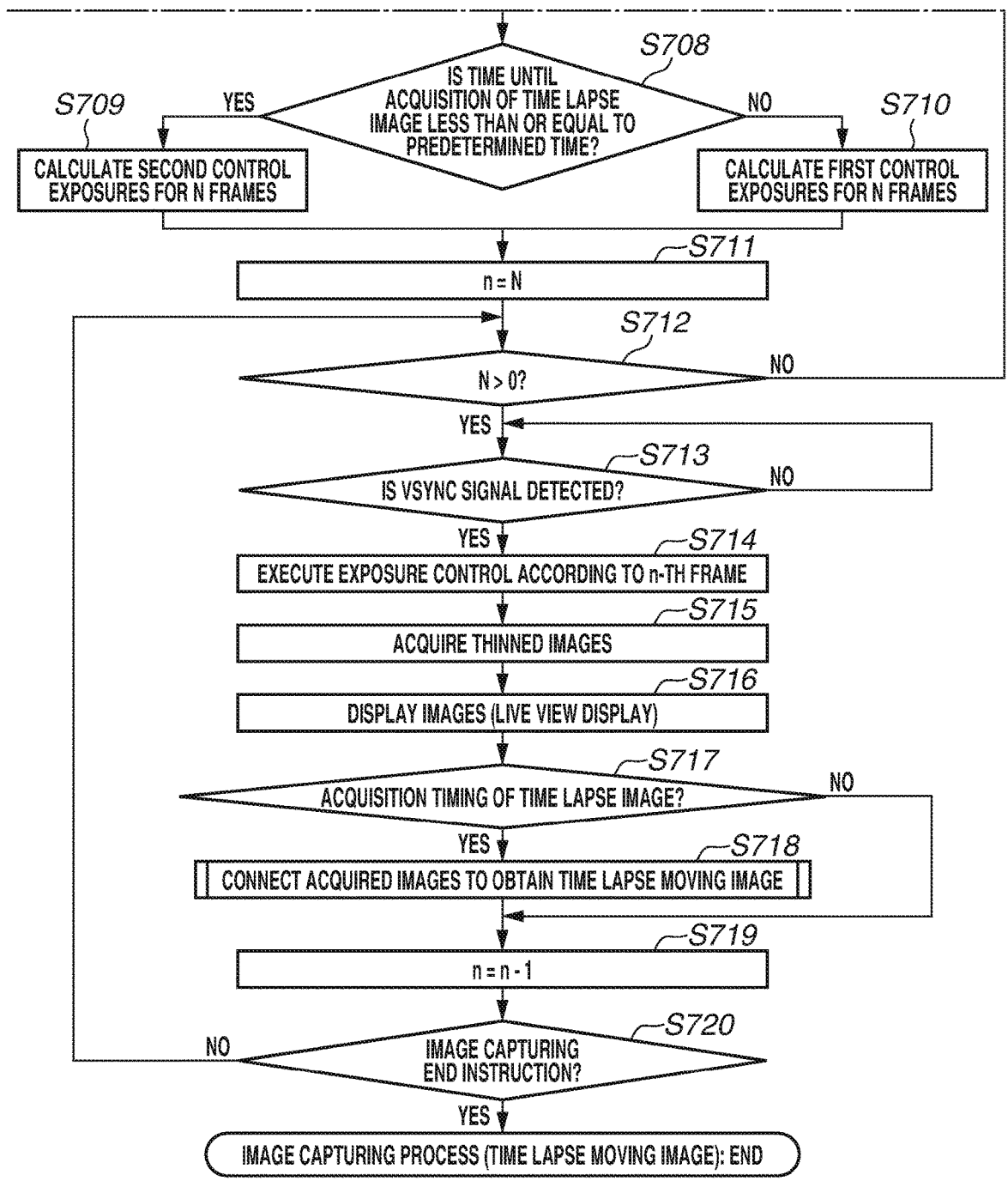
FIG. 7 (including FIGS. 7A and 7B) is a flowchart illustrating an image capturing process in a time lapse mode according to a first exemplary embodiment.

Next, with reference to FIGS. 7A and 7B, an image capturing process in the time lapse mode is described. FIGS. 7 A and 7B are a flowchart illustrating an image capturing process in the time lapse mode according to the first exemplary embodiment of the present disclosure. In the normal moving image mode, photometric calculation is executed for every plurality of frames, and based on a photometric value calculated by the photometric calculation, exposure control is smoothly executed in units of a plurality of frames. In this case, even if the brightness smoothly changes in the entirety of a moving image acquired in the normal moving image mode, the brightness of each frame (image) included in the moving image may be different from the appropriate brightness of an object. That is, the images corresponding to the respective frames of the moving image acquired in the normal moving image mode may include an image captured and acquired in the state where the exposure does not reach the target exposure. Thus, if exposure control is executed in the time lapse mode similarly to the normal moving image mode, a control exposure may not reach the target exposure at the timing for acquiring a time lapse image.

At this time, a time lapse moving image is configured to be acquired by setting (selecting) time lapse images from among images included in a moving image according to predetermined image capturing intervals (setting intervals), and connecting the set time lapse images. The time lapse moving image is represented by compressing temporal changes in an object. Thus, the reproduction time of the moving image is shorter than the total time of capturing images. Thus, the number of times the image of the object is captured to acquire a single time lapse moving image is greater than in a case where a normal moving image is acquired. For example, to acquire a time lapse moving image for about a minute, it may even be necessary to capture images several hundred to several thousand times. Thus, to acquire a time lapse moving image using a mechanical shutter (without using an electronic shutter), the number of times the mechanical shutter is driven may reach the durable number of times soon. Further, in a case where almost all effective pixels of the image sensor 103 are used for exposure without executing thinning accumulation, temporal differences occur from the first exposure row to the last exposure row of the image sensor 103. Thus, distortion (shutter distortion) may occur in an image acquired in a case where an image of a moving object is captured. In response to the above problems, the configuration in which time lapse images are selected from among images included in a moving image as in the present exemplary embodiment has the advantage of preventing the number of times the mechanical shutter is driven from reaching the durable number of times soon, the advantage of reducing distortion of an object occurring on an image when a moving object is captured, and the advantage of allowing a reduction in the number of components of the mechanical shutter.

At this time, if images acquired based on follow-up control of the exposure in the normal moving image mode are simply used to generate a time lapse moving image, images having inappropriate brightness are connected together, whereby the brightness between frames in the time lapse moving image unnaturally changes. Particularly, in a case where exposure control is executed by changing the aperture diameter of the diaphragm 203, which is a mechanical component, unevenness of exposure may occur in a frame (an image) acquired while the aperture diameter of the diaphragm 203 is changed. Further, it is difficult to accurately obtain the difference in exposure (the difference) from the target exposure in a frame acquired while the aperture diameter of the diaphragm 203 is changed. Thus, it is difficult to perform gain adjustment or image processing on an image in which unevenness of exposure occurs as described above, or an image of which the difference in exposure deviates from an assumed value, thereby correcting the brightness of the image to accurate brightness.

Further, a time lapse moving image desired by the user can be generated by connecting intermittently acquired images based on image capturing intervals optionally set by the user. Thus, if an image after a change in the exposure by exposure control is completed (after the exposure reaches the target exposure) is set as a time lapse image, image capturing intervals (acquisition intervals) may irregularly change. Thus, the time lapse moving image intended by the user may not be acquired. In response, in the present exemplary embodiment, a control exposure with respect to each frame is set based on image capturing intervals, and based on the control exposure, follow-up control (second follow-up control) of the exposure is executed, thereby solving this problem. The details of this are described below.

As illustrated in FIGS. 7A and 7B, based on the fact that an instruction to record a time lapse moving image is given in the time lapse mode, the image capturing process is started. The process of step S701 is similar to that of step S301 in the normal moving image mode, and therefore is not described here. In step S702, the camera control unit 101 acquires lens information from the lens unit 200 attached to the camera main body 100. The lens information at least includes information regarding the driving time (the change time of the aperture diameter) of the diaphragm 203 per unit time. Further, in a case where the camera 1 is a lens-integrated camera, the camera control unit 101 reads information regarding the driving time of the diaphragm 203 stored in the memory 102. In the present exemplary embodiment, the configuration may be such that the lens information includes information regarding the driving speed of the diaphragm 203.

Next, in step S703, based on the lens information acquired in step S702, the camera control unit 101 determines whether the shortest time required to drive the diaphragm 203 in a predetermined number of steps in the Additive System of Photographic Exposure (APEX) unit is less than or equal to a predetermined time. In the present exemplary embodiment, the camera control unit 101 calculates the shortest time (the shortest change time) required to change the aperture diameter of the diaphragm 203 by an amount corresponding to three exposure steps, and compares the calculated shortest time with the predetermined time. As the predetermined time, any value may be set. In the present exemplary embodiment, as an average time required to change the aperture diameter of a diaphragm for various lenses in three steps (3 Ev in the APEX unit), 50 ms is set as the predetermined time. Further, in the present exemplary embodiment, among a plurality of exposure parameters, the predetermined time is set according to the time required to change the aperture diameter of a diaphragm, which requires a long time to change the same amount of exposure. The present exemplary embodiment, however, is not limited to this. Alternatively, for example, the time required to change another exposure parameter by a predetermined amount may be set as the predetermined time. Particularly, in a case where a neutral density (ND) filter, which is a mechanical component similarly to a diaphragm, is included, the time required to change the light transmittance of the ND filter by a predetermined amount may be set as the predetermined time.

If the camera control unit 101 determines that the shortest change time is longer than the predetermined time (NO in step S703), then in step S704, the camera control unit 101 sets the current predetermined time to the calculated shortest change time of the diaphragm 203. Further, if the camera control unit 101 determines that the shortest change time is less than or equal to the predetermined time (YES in step S703), the processing proceeds to step S705. The processes of steps S705 and S706 are similar to those of steps S302 and S303 in the normal moving image mode, and therefore are not described here.

Next, in step S707, the camera control unit 101 reads the previously set acquisition intervals (image capturing intervals) of time lapse images from the memory 102. Next, in step S708, based on the acquisition intervals read in step S707 and the result of the time measurement of the built-in timer 101a, the camera control unit (determination unit) 101 determines whether the time until the acquisition of a time lapse image is started next is less than or equal to the predetermined time. If the camera control unit 101 determines that the time until the acquisition of a time lapse image is started is longer than the predetermined time (NO in step S708), the processing proceeds to step S710. Further, if the camera control unit 101 determines that the time until the acquisition of a time lapse image is started is less than or equal to the predetermined time (YES in step S708), the processing proceeds to step S709. The process of step S710 is similar to the process of step S304 in the normal moving image mode, and therefore is not described here.

In step S709, based on the target exposure set in step S706, the control value calculation unit 117 calculates control exposures (second control exposures) for executing second follow-up control. Specifically, based on the difference between the current exposure and the target exposure, the control value calculation unit 117 calculates control exposures for a predetermined number of frames N. At this time, the second follow-up control is a control method for, taking into account the grade of a time lapse image, executing early follow-up (rapid follow-up) of the exposure toward the target exposure according to the acquisition of a time lapse image. The details of this are described below with reference to FIG. 8.

Figure 8:
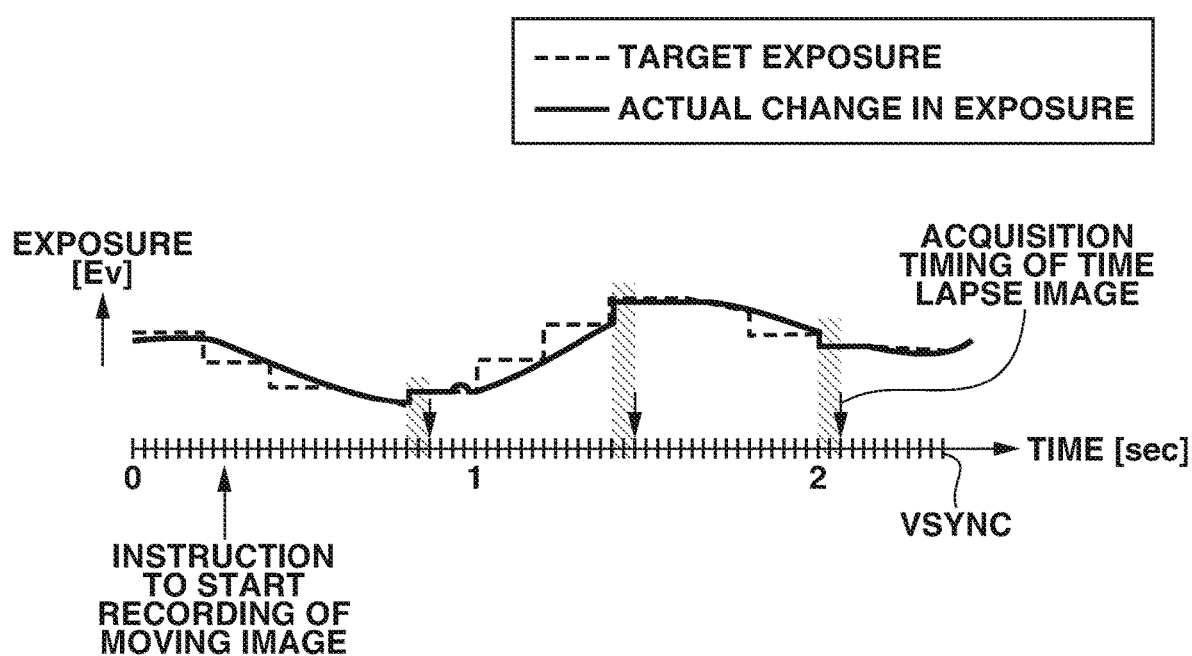
FIG. 8 is a diagram illustrating a relationship between a frame rate and a predetermined number of frames N in which an exposure is changed toward a target exposure in the time lapse mode according to the first exemplary embodiment.

FIG. 8 is a diagram illustrating the relationship between the frame rate and the predetermined number of frames N in which the exposure is changed toward the target exposure in the time lapse mode according to the first exemplary embodiment of the present disclosure. FIG. 8 illustrates a case where the exposure is changed by changing the aperture diameter of the diaphragm 203.

As illustrated in FIG. 8, in the time lapse mode, outside a predetermined period based on the timing for acquiring a time lapse image, an operation similar to that in the normal moving image mode is executed. That is, in the time lapse mode, outside the predetermined period, similarly to the normal moving image mode, the control exposures of the respective frames are set so that LV display smoothly changes. Within the predetermined period based on the acquisition timing of a time lapse image (which corresponds to gray filled portions in FIG. 8), the exposure is steeply changed toward the target exposure so that the time lapse image has appropriate brightness. Then, exposure control is executed based on the set control exposures. Regarding the display and the recording of images, an image read at the generation timing of a VSYNC signal is used for LV display, and from among frames used for the display, time lapse images set based on the image capturing intervals are used to generate a time lapse moving image.

The above configuration is specifically described. By a method similar to that in the process of step S304, the control value calculation unit 117 calculates the control exposures of frames corresponding to the period (outside the predetermined period) from the previous acquisition timing of a time lapse image to a predetermined time before the next acquisition timing. This predetermined time is the same as the predetermined time used in the determination in step S708.

In contrast, the control value calculation unit 117 sets the control exposures of the respective frames corresponding to the period (the predetermined period) from the predetermined time before the next acquisition timing to the next acquisition timing to the same value as that of the target exposure. In other words, in the time lapse mode, at a plurality of types of timing for executing photometric calculation, the target exposure set based on photometric calculation executed immediately before a time lapse image is acquired, and the control exposures of the respective frames have the same value. In this case, when the same amount of exposure is changed, the exposure changes more steeply by the degree of change (a first degree of change) in the exposure of the frames corresponding to the predetermined period than by the degree of change (a second degree of change) in the exposure of the frames corresponding to the period outside the predetermined period. However, this does not apply to a case where the process of step S710 is executed as a result of the determination in step S708. Further, the degree of change in the exposure of the respective frames in the normal moving image mode is approximately the same as the second degree of change.

Figure 9:
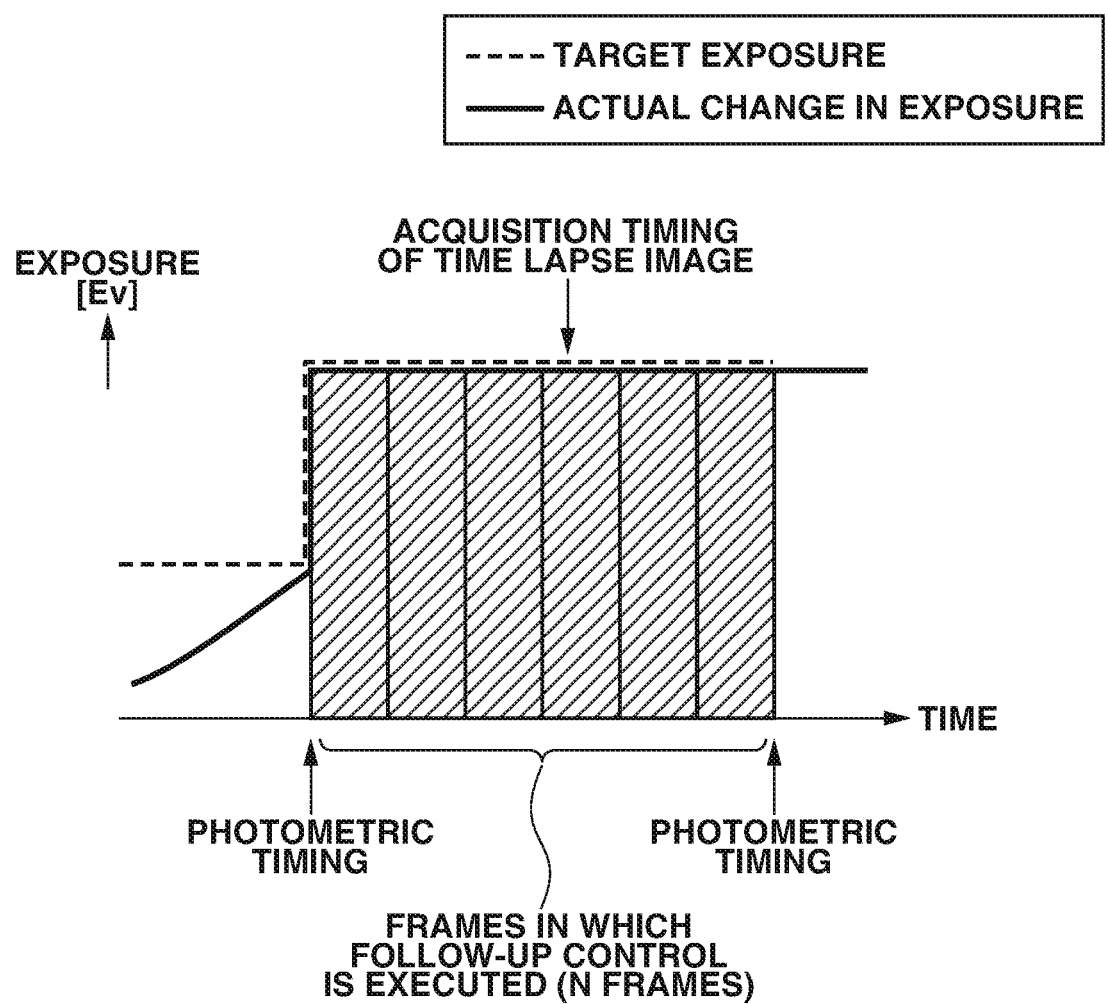
FIG. 9 is a diagram illustrating changes in the exposure in N predetermined frames in the time lapse mode according to the first exemplary embodiment.

FIG. 9 illustrates this state. FIG. 9 is a diagram illustrating changes in the exposure in N predetermined frames in the time lapse mode according to the first exemplary embodiment of the present disclosure. As illustrated in FIG. 9, the above configuration is employed, whereby in the present exemplary embodiment, the exposure can reach the target exposure before the acquisition timing of a time lapse image. Thus, the camera 1 according to the present exemplary embodiment can acquire a time lapse image having appropriate brightness for the luminance of an object (a time lapse image for which the target exposure is set). Thus, it is possible to prevent an unnatural change in the brightness of a time lapse moving image. In the examples illustrated in FIGS. 8 and 9, temporal changes in the aperture diameter of the diaphragm 203 in the second follow-up control are ignored on the assumption that the aperture diameter of the diaphragm 203 can be immediately changed. Actually, however, a certain time is required to change the aperture diameter of the diaphragm 203 to a target aperture diameter.

Referring back to FIGS. 7A and 7B, the processes of steps S711 to S716 are similar to the processes of steps S305 to S309 in the normal moving image mode, and therefore are not described here. Next, in step S717, according to the result of the time measurement of the built-in timer 101a based on the image capturing intervals set in advance, the camera control unit 101 determines whether the current frame is a frame corresponding to the acquisition timing of a time lapse image.

If the camera control unit 101 determines that the current frame is not the acquisition timing of a time lapse image (NO in step S717), the processing proceeds to step S719. If the camera control unit 101 determines that the current frame is the acquisition timing (YES in step S717), the processing proceeds to step S718. Then, in step S718, the camera control unit 101 executes the process of connecting the acquired time lapse images in the order of acquisition (capturing) to sequentially obtain a moving image. The process of step S719 is similar to the process of step S312 in the normal moving image mode, and therefore is not described here.

Next, in step S720, the camera control unit 101 determines whether an instruction to end the acquisition of a time lapse moving image is given. An instruction to end the acquisition of a time lapse moving image is given in a case where a condition set in advance for ending the acquisition of a time lapse moving image is satisfied, in addition to a case where an instruction to end the capturing of an image is given according to an operation of the user. In this case, in step S720, the camera control unit 101 determines whether the number of times of acquisition (or the image capturing time) of a time lapse image reaches the total number of times of acquisition (or the total image capturing time) set in advance. Then, if the camera control unit 101 determines that the number of times of acquisition of a time lapse image does not reach the total number of times of acquisition (NO in step S720), the processing returns to the process of step S712. If the camera control unit 101 determines that the number of times of acquisition reaches the total number of times of acquisition (YES in step S720), the image capturing process ends. This is the image capturing process in the time lapse mode according to the present exemplary embodiment.

As described above, in the time lapse mode, normally, taking into account the visual quality of LV display, the camera 1 according to the present exemplary embodiment smoothly changes the exposure in response to a change in the luminance of an object. Then, taking into account the grade of a time lapse moving image, the camera 1 steeply changes the exposure toward a target exposure corresponding to the luminance of the object according to the acquisition timing of a time lapse image. With this configuration, in the time lapse mode, the camera 1 according to the present exemplary embodiment can prevent a reduction in the grade of LV display as much as possible, while preventing a reduction in the grade of a time lapse image. Particularly, even in a case where the exposure is changed by changing the aperture diameter of the diaphragm 203, it is possible to prevent unevenness of exposure from occurring in a single frame according to temporal changes in the aperture diameter. Thus, in a case where the above configuration is carried out, it is possible not only to prevent a reduction in the grade of an acquired time lapse image, but also to acquire, taking into account subsequent image processing, a time lapse image in which unevenness of exposure does not occur. Thus, the camera 1 according to the present exemplary embodiment can prevent an unnatural change in the brightness of a portion corresponding to an object in a time lapse moving image.

Figure 10:
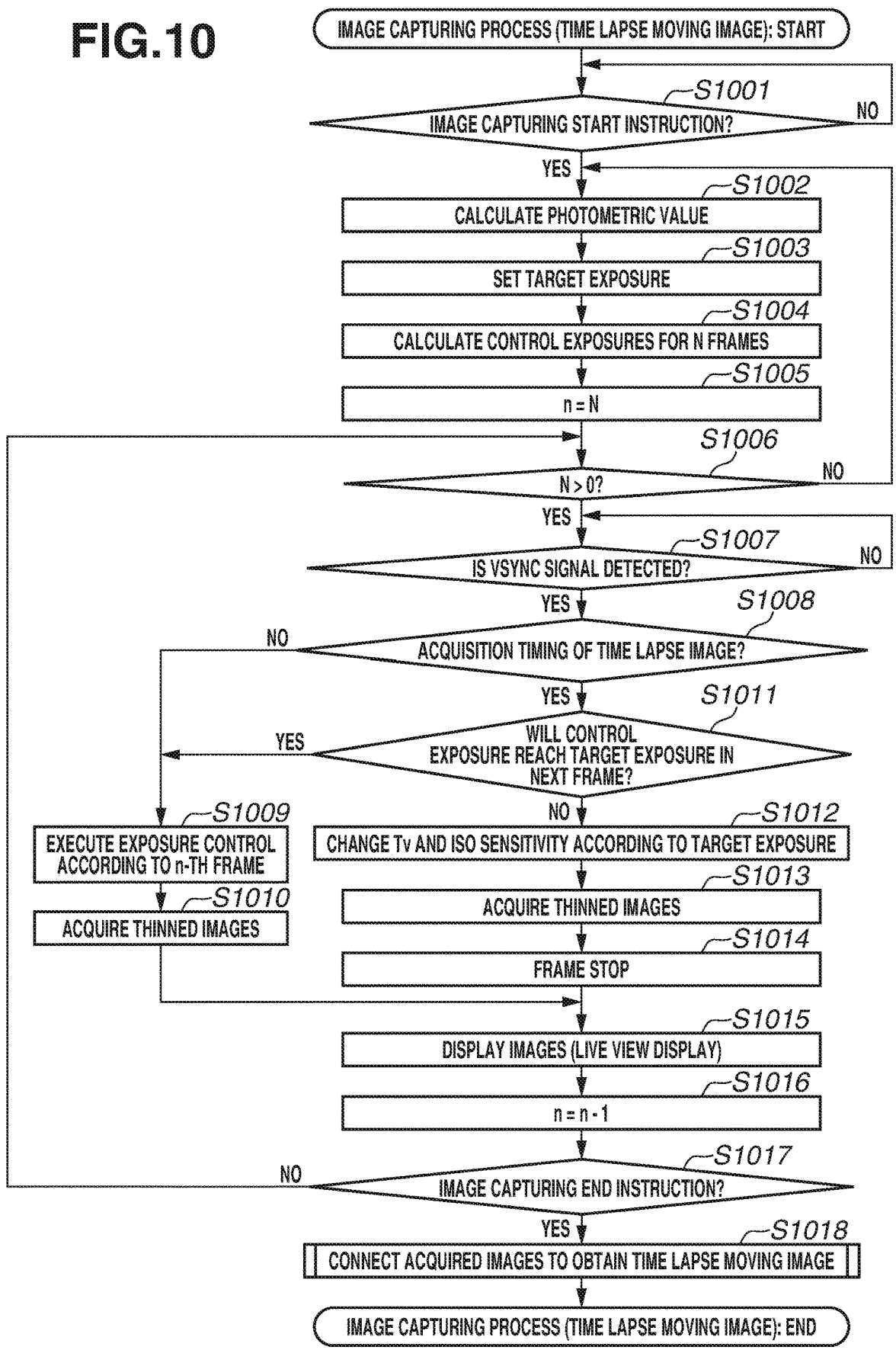
FIG. 10 is a flowchart illustrating an image capturing process in a time lapse mode according to a second exemplary embodiment.
Figure 11:
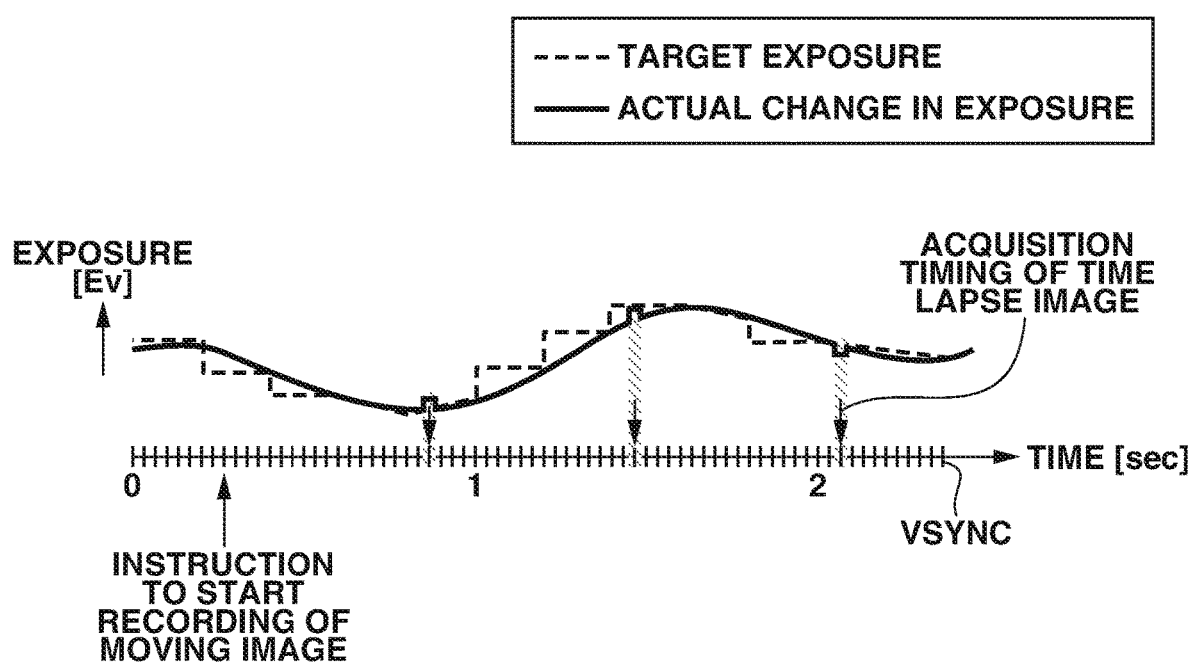
FIG. 11 is a diagram illustrating a relationship between a frame rate and a predetermined number of frames N in which an exposure is changed toward a target exposure in the time lapse mode according to the second exemplary embodiment.
Figure 12:
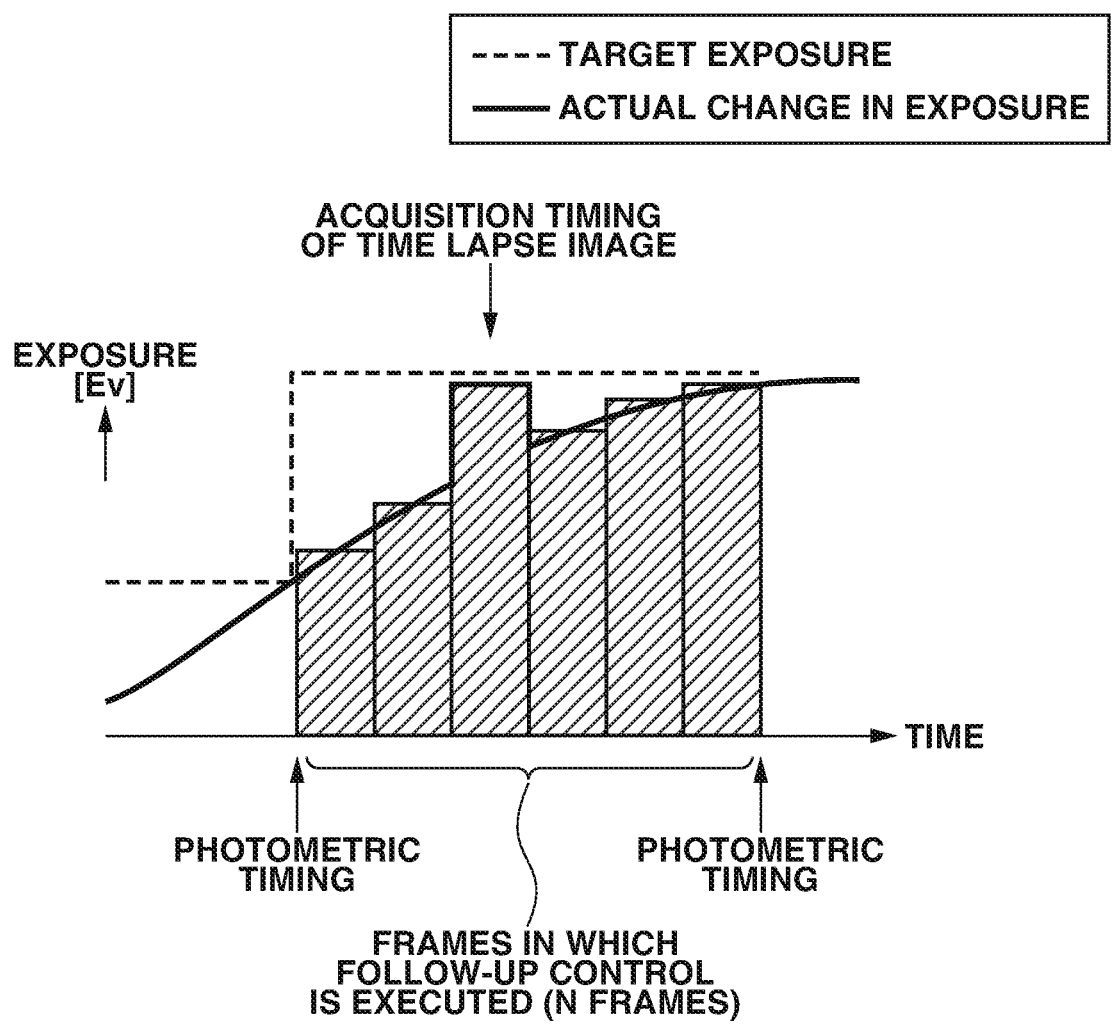
FIG. 12 is a diagram illustrating changes in the exposure in N predetermined frames in the time lapse mode according to the second exemplary embodiment.

Next, with reference to FIGS. 10 to 12, a description is given of a second exemplary embodiment of the image capturing apparatus in which various embodiments are carried out. In the first exemplary embodiment, the configuration is such that in the time lapse mode, a time lapse image acquired while images are sequentially displayed (subjected to LV display) is also used for LV display. In contrast, in the present exemplary embodiment, a time lapse image is not used for LV display, and a control exposure is temporarily matched to a target exposure according to the acquisition of the time lapse image, whereby it is possible to prevent an unnatural change in the brightness in LV display. The details of this are described below. A digital camera (hereinafter referred to simply as "camera") 1, which is the image capturing apparatus according to the present exemplary embodiment, has similar configuration to that in the first exemplary embodiment. Thus, the components of the camera 1 are designated by the same numbers as those in the first exemplary embodiment.

FIG. 10 is a flowchart illustrating an image capturing process in the time lapse mode according to the second exemplary embodiment of the present disclosure. As illustrated in FIG. 10, based on the fact that an instruction to record a time lapse moving image is given in the time lapse mode, the image capturing process is started. The processes of steps S1001 to S1007 are similar to the processes of steps S301 to S307 in the normal moving image mode in the first exemplary embodiment, and therefore are not described here.

In step S1008, according to the result of the time measurement of the built-in timer 101a based on the image capturing intervals set in advance, the camera control unit 101 determines whether the current frame is a frame corresponding to the acquisition timing of a time lapse image. If it is determined that the current frame is not the acquisition timing of a time lapse image (NO in step S1008), the processing proceeds to step S1009. The processes of steps S1009 and S1010 are similar to those of steps S307 and S308 in the first exemplary embodiment, and therefore are not described here. If, on the other hand, it is determined that the current frame is the acquisition timing of a time lapse image (YES in step S1008), the processing proceeds to step S1011.

In step S1011, the camera control unit 101 determines whether the control exposure will reach the calculated target exposure in the next frame. Then, if it is determined that the control exposure will reach the target exposure (YES in step S1011), the processing proceeds to step S1009. If it is determined that the control exposure will not reach the target exposure (NO in step S1011), the processing proceeds to step S1012.

In step S1012, the camera control unit 101 changes the shutter speed (Tv) and the imaging sensitivity (the International Organization for Standardization (ISO) sensitivity) according to the target exposure, thereby executing exposure control. In the exposure control in this case, a target exposure is temporarily set for the time lapse image without taking into account the visual quality of LV display. Thus, even while exposure control is executed so that the exposure smoothly changes according to N frames, exposure control is executed so that the exposure temporarily reaches the target exposure at the acquisition timing of a time lapse image. The reason why exposure control is executed using exposure parameters such as the shutter speed and (or) the imaging sensitivity is that the time required to change approximately the same exposure is shorter using the shutter speed or the imaging sensitivity than using the diaphragm value. With this configuration, it is possible to cause the actual exposure to reach a target exposure in a short time less than a single frame in the present exemplary embodiment.

FIG. 11 is a diagram illustrating the relationship between the frame rate and the predetermined number of frames N in which the exposure is changed toward the target exposure in the time lapse mode according to the second exemplary embodiment of the present disclosure. FIG. 12 is a diagram illustrating changes in the exposure in the predetermined number of frames, which is N, in the time lapse mode according to the second exemplary embodiment of the present disclosure. FIGS. 11 and 12 illustrate a case where the exposure is changed by changing the diaphragm value in the period except the acquisition timing of a time lapse image, and changing the shutter speed and the imaging sensitivity at the acquisition timing of a time lapse image.

As illustrated in FIGS. 11 and 12, in the time lapse mode, outside a predetermined period based on the timing for acquiring a time lapse image, the camera 1 according to the present exemplary embodiment executes exposure control similar to that in the normal moving image mode in the first exemplary embodiment. That is, outside the predetermined period, the control exposures of the respective frames (N frames) are set so that the brightness smoothly changes in LV display according to a change in the luminance of an object. In contrast, within the predetermined period, exposure control is executed so that as illustrated in FIGS. 11 and 12, the exposure steeply changes so that a control exposure temporarily reaches the target exposure.

Referring back to FIG. 10, in step S1013, similarly to steps S308 and S715, the camera control unit executes thinning accumulation of the image sensor 103 to capture an image of an object, thereby acquiring thinned images. Then, in step S1014, the camera control unit 101 does not use the thinned images (time lapse images) acquired in step S1013 for LV display, and selects an image signal displayed in the most recent frame again for LV display (a frame stop). The processes of steps S1015 to S1017 are similar to the processes of steps S716, S719, and S720 in the first exemplary embodiment, and therefore are described here.

As a control exposure temporarily changed according to the acquisition timing of a time lapse image, a control exposure is set again according to the acquisition of image data corresponding to the next frame so that the exposure changes by approximately the same degree of change as that in the normal moving image mode. At this time, as illustrated in FIGS. 11 and 12, a control exposure is set taking into account an exposure corresponding to a case where the exposure is changed similarly to the normal moving image mode in the predetermined period in view of the period in which the frame stop is performed. In addition to this, the configuration may be such that the control exposure is changed back to that before the change. In this case, control exposures for N frames are calculated in view of the period in which the frame stop is performed.

In step S1018, according to the image capturing end instruction, the camera control unit 101 connects the already acquired time lapse images in the order of acquisition to generate a time lapse moving image. This is the time lapse mode in the present exemplary embodiment. The predetermined period in the present exemplary embodiment is a period corresponding to a single frame indicating each of the generation intervals of a VSYNC signal (gray filled portions in FIG. 11). Alternatively, another period may be set as the predetermined period.

As described above, the camera 1 according to the present exemplary embodiment is configured to temporarily change the shutter speed and the imaging sensitivity according to the timing for acquiring a time lapse image, thereby performing control so that the brightness of the image reaches a target exposure. Then, the camera 1 according to the present exemplary embodiment is configured not to use for LV display the image acquired in this temporary change in the exposure. This configuration is employed, whereby the camera 1 according to the present exemplary embodiment can prevent an unnatural change in the brightness of an object in LV display, while acquiring time lapse images. Then, this configuration is employed, whereby the camera 1 according to the present exemplary embodiment can prevent an unnatural change in the brightness of the object also in a time lapse moving image generated by connecting the time lapse images in order.

While the desirable exemplary embodiments of the present disclosure have been described, the present disclosure is not limited to these exemplary embodiments, but embodiments may include various modifications and changes without departing from the spirit and scope of the invention. For example, in the above exemplary embodiments, the configuration is such that a time lapse moving image is generated within the camera 1. Alternatively, the configuration may be such that a time lapse moving image is generated in an external device or on a computer network.

In the above exemplary embodiments, a case has been described where outside the predetermined period, the exposure is changed by changing the aperture diameter of the diaphragm 203. The configurations of the above exemplary embodiments, however, are effective also in a case where the exposure is changed using another exposure parameter.

Further, in the above exemplary embodiments, as illustrated in FIG. 9, all the control exposures corresponding to N predetermined frames in a single cycle that overlaps the acquisition timing of a time lapse image are set to the same value as that of the target exposure. The exemplary embodiments, however, are not limited to this. For example, the values of the respective control exposures of N predetermined frames that overlap the acquisition timing of a time lapse image may be different from each other so long as the exposure can reach the target exposure before the acquisition of the time lapse image. In this case, the control exposures are changed step by step until the frame in which the time lapse image is acquired, whereby it is possible to moderate the degree of change in the exposure. Thus, it is possible to prevent an abrupt change in the brightness between frames in LV display.

Further, in the above exemplary embodiments, a description has been given of the configuration in which the exposure is changed when an image of an object is captured. The exemplary embodiments, however, are not limited to this. For example, the configuration may be such that in the time lapse mode, images are acquired by executing the first follow-up control, giving priority to the grade of LV display, and the digital gain amounts of, among the acquired images, images for use in generating a time lapse moving image are changed. In this case, it is desirable that every time an image of an object is captured (or every time a time lapse image is acquired at a predetermined interval determined in advance), information regarding the difference between a control exposure and a target exposure should be stored in association with the image. With this configuration, when a time lapse moving image is generated, it is possible to set the digital gain amounts of time lapse images to optimal values based on this information.

Further, in the above exemplary embodiments, follow-up control of the exposure has been described. An approximately similar configuration is also applicable to follow-up control of WB adjustment. For example, in FIGS. 7 A and 7B, in step S704, WB calculation is performed. In step S705, based on the result of the calculation, a target value for WB adjustment is set. In step S709 or S710, control values for WB adjustment are calculated. In this case, when the same amount of WB adjustment is made, the degree of WB adjustment (the degree of change) in the predetermined period is steeper using second control values for WB adjustment calculated in step S709 than using first control values for WB adjustment calculated in step S710. A predetermined time regarding WB adjustment may be set to the shortest time required to execute a predetermined amount of WB adjustment in the predetermined period. With this configuration, it is possible to acquire a time lapse image in which the brightness of an object is appropriately subjected to WB adjustment. Thus, it is possible to prevent an unnatural change in the brightness of the object in a time lapse moving image.

Further, in the above exemplary embodiments, the configuration is such that the components included in the camera 1, such as the camera control unit 101, the memory 102, the image processing unit 106, and the memory control unit 107, operate cooperatively with each other, thereby controlling the operation of the camera 1. The exemplary embodiments, however, are not limited to this. Alternatively, the configuration may be such that, for example, a (computer) program according to the flows illustrated in FIGS. 3 and 7 is stored in advance in the memory 102. Then, the camera control unit 101 including a microcomputer executes the program, thereby controlling the operation of the camera 1. Further, as the form of the program, any form such as an object code, a program executed by an interpreter, or script data supplied to an operating system (OS) can be employed so long as the employed form has the function of a program. Further, as a recording medium for supplying the program, a magnetic recording medium such as a hard disk or a magnetic tape, or an optical or magneto-optical recording medium may be employed.

Further, in the above exemplary embodiments, a digital camera has been described as an example of the image capturing apparatus in which various embodiments are carried out. The exemplary embodiments, however, are not limited to this. Alternatively, for example, the configuration may be such that an image capturing apparatus other than a digital camera, such as a portable device, e.g., a digital video camera or a smartphone, a wearable terminal, or a security camera, may be employed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

What is claimed is:

1. An image capturing apparatus that can perform a live view display for sequentially displaying a first image acquired using an image capturing device of the image capturing apparatus, the image capturing apparatus comprising:

at least one processor configured to perform operations of the following units:
a photometric unit configured to perform photometry on an object;
an exposure control unit configured to control an exposure based on a result of the photometry of the object;
an image capturing control unit configured to perform control so as to obtain intermittently a second image for generating a time lapse moving image, the time lapse moving image being different from the first image; and a display control unit configured to control displaying of an image on a display, wherein, in a case where an operation of obtaining the second image is performed during the live view display, the display control unit performs control so as not to newly display the first image on the display during a predetermined period for obtaining the second image and so as to start newly displaying the first image after the predetermined period has passed, and wherein the exposure control unit is able to perform control to change the exposure by a first degree of change in the predetermined period and to change the exposure by a second degree of change outside of the predetermined period, the second degree of change being more moderate than the first degree of change.

2. The image capturing apparatus according to claim 1, wherein a limit for the change in exposure by the first degree of change in a period corresponding to a single frame of the live view display is greater than a limit for the change in exposure by the second degree of change in the period.

3. The image capturing apparatus according to claim 1, wherein, in a case where the operation of obtaining the second image is performed during the live view display, the image capturing control unit performs control so as to not obtain newly the first image in the predetermined period.

4. The image capturing apparatus according to claim 1, wherein, in a case where the operation of obtaining the second image is performed during the live view display, the display control unit performs control so as to continuously display, in the predetermined period, the first image which has already been displayed just before on the display.

5. The image capturing apparatus according to claim 2, further comprising a target value setting unit configured to set a target value regarding an exposure when an image is acquired using the image capturing device, based on a result of the photometry performed by the photometric device;

wherein, in a case where an amount of change in exposure to the target value is over the limit for the change in exposure by the second degree of change outside of the predetermined period, the exposure control unit performs control so as to change an exposure to the target value by a plurality of frames of the live view display.

6. The image capturing apparatus according to claim 5, wherein, in a case where the operation of obtaining the second image is performed during the live view display, the exposure control unit performs control so as to change an exposure to the target value in the predetermined period.

7. The image capturing apparatus according to claim 1, wherein the image capturing apparatus can obtain a different type movie image different from the time lapse moving image, and wherein a total time required to acquire the time lapse moving image is longer than a total time required to acquire the different type moving image, for the same reproduction time.

8. The image capturing apparatus according to claim 1, wherein the exposure control unit temporarily changes a parameter regarding the exposure other than a diaphragm value in the predetermined period.

9. The image capturing apparatus according to claim 1, wherein, in a case where the operation of obtaining the second image is performed during the live view display, the display control unit performs control so as not to display the second image on the display in the predetermined period.

10. The image capturing apparatus according to claim 1, wherein the first image is an image obtained by execution of thinning accumulation by the image capturing device to capture an image of an object, and wherein the second image is an image obtained by execution of the thinning accumulation by the image capturing device with the same ratio as that for the first image.

11. A method for controlling an image capturing apparatus, the method being for performing a live view display for sequentially displaying a first image acquired using an image capturing device of the image capturing apparatus, the method comprising:

performing photometry on an object;

based on a result of the photometry, controlling an exposure;

performing control so as to obtain intermittently a second image for generating a time lapse moving image, the time lapse moving image being different from the first image; and controlling a displaying of an image on a display, wherein, in a case where an operation of obtaining the second image is performed during the live view display, performing control so as not to newly display the first image on the display during a predetermined period for obtaining the second image and so as to start newly displaying the first image after the predetermined period has passed, and wherein, in the exposure controlling, the exposure by a first degree of change is changeable in the predetermined period and the exposure by a second degree of change is changeable outside of the predetermined period, the second degree of change being more moderate than the first degree of change.

12. A non-transitory computer-readable storage medium storing instructions for causing a computer to execute a process for controlling an image capturing apparatus, the process being for performing a live view display for sequentially displaying a first image acquired using an image capturing device of the image capturing apparatus, the process comprising:

performing photometry on an object;

based on a result of the photometry, exposure controlling an exposure;

performing control so as to obtain intermittently a second image for generating a time lapse moving image, the second image being different from the first image; and controlling a displaying of an image on a display, wherein, in a case where an operation of obtaining the second image is performed during the live view display, performing control so as not to newly display the first image on the display during a predetermined period for obtaining the second image and so as to start newly displaying the first image after the predetermined period has passed, and wherein, in the exposure controlling, the exposure by a first degree of change is changeable in the predetermined period and the exposure by a second degree of change outside of the predetermined period, the second degree of change being more moderate than the first degree of change is changeable.

* * * * *